United States Patent [19]

Duke et al.

[11] 4,127,614
[45] Nov. 28, 1978

[54] IMPACT-RESISTANT OLEFINIC-NITRILE OLEFINIC-ESTER COPOLYMERS PREPARED IN THE PRESENCE OF AN OLEFINIC-ESTER COPOLYMER ELASTOMER

[75] Inventors: June T. Duke, Chagrin Falls; Dorothy C. Prem, Warrensville Heights, both of Ohio

[73] Assignee: The Standard Oil Company, Cleveland, Ohio

[21] Appl. No.: 709,536

[22] Filed: Jul. 28, 1976

Related U.S. Application Data

[63] Continuation-in-part of Ser. No. 361,170, May 17, 1973, abandoned.

[51] Int. Cl.$^2$ .............................................. C08L 63/00
[52] U.S. Cl. .................................. 260/836; 260/881; 260/884; 260/885

[58] Field of Search ................ 260/836, 881, 884, 885

[56] References Cited

FOREIGN PATENT DOCUMENTS

1,561,658  8/1958  Canada.
690,937  4/1953  United Kingdom.

*Primary Examiner*—Richard B. Turer
*Attorney, Agent, or Firm*—John F. Jones; Larry W. Evans

[57] ABSTRACT

Impact-resistant polymers having low permeability to gases and vapors and excellent thermal color stability are prepared by polymerizing an olefinic nitrile, such as acrylonitrile, optionally with an olefinic ester, such as methyl acrylate, in an aqueous medium in the presence of an elastomer which is a copolymer of an ester of an olefinically unsaturated monocarboxylic acid, such as ethyl acrylate.

9 Claims, No Drawings

IMPACT-RESISTANT OLEFINIC-NITRILE OLEFINIC-ESTER COPOLYMERS PREPARED IN THE PRESENCE OF AN OLEFINIC-ESTER COPOLYMER ELASTOMER

This application is a continuation-in-part of our copending application Ser. No. 361,170 filed May 17, 1973, now abandoned.

The present invention relates to novel polymeric compositions which have low permeability to gases and vapors and improved resistance to discoloration by heat, and more particularly pertains to synthetic polymeric resins which are composed of an olefinically unsaturated nitrile and an ester of an olefinically unsaturated carboxylic acid, and to a process for preparing same.

The polymeric products of the present invention are prepared by polymerizing a major portion of an olefinically unsaturated nitrile, such as acrylonitrile, and a minor portion of an ester of an olefinically unsaturated carboxylic acid, such as methyl acrylate, in the presence of a preformed rubbery copolymer composed of at least one ester of an olefinically unsaturated carboxylic acid, such as ethyl acrylate.

The olefinically unsaturated nitriles useful in the present invention are the alpha, beta-olefinically unsaturated mononitriles having the structure

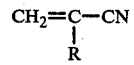

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile, and mixtures thereof.

The esters of olefinically unsaturated carboxylic acids useful in the present invention are preferably the lower alkyl esters and epoxy esters of alpha, beta-olefinically unsaturated carboxylic acids and more preferably esters having the structure

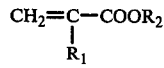

wherein $R_1$ is hydrogen, an alkyl group having from 1 to 4 carbon atoms, or a halogen, and $R_2$ is an alkyl group having from 1 to 6 carbon atoms or an epoxy or oxirane group having from 2 to 6 carbon atoms. Compounds of this type include methyl acrylate, ethyl acrylate, the propyl acrylates, the butyl acrylates, the amyl acrylates, the hexyl acrylates, and glycidyl acrylate; methyl methacrylate, ethyl methacrylate, the propyl methacrylates, the butyl methacrylates, the amyl methacrylates, the hexyl methacrylates, and glycidyl methacrylate; methyl, alpha-chloroacrylate, ethyl, alpha-chloroacrylate, and the like. Most preferred in the present invention are methyl acrylate, ethyl acrylate, the propyl acrylates, the butyl acrylates, glycidyl acrylate, methyl methacrylate, ethyl methacrylate, and glycidyl methacrylate.

The polymeric compositions of the present invention can be prepared by any of the generally known techniques of polymerization including the bulk polymerization, solution polymerization, and emulsion or suspension polymerization techniques by batch, continuous or intermittent addition of the monomers and other components. The preferred method is emulsion polymerization. The important point in the novel process of this invention is that the novel polymeric products are prepared by polymerizing the olefinically unsaturated nitrile and the ester of the olefinically unsaturated carboxylic acid in the presence of a preformed elastomer copolymer of the ester of the olefinically unsaturated carboxylic acid. The polymerization is preferably carried out in an aqueous medium in the presence of an emulsifier and a free-radical generating polymerization initiator at a temperature of from about 0° to 100° C. in the substantial absence of molecular oxygen. The physical blending of a copolymer of the olefinically unsaturated nitrile and ester of an olefinically unsaturated carboxylic acid with an elastomer copolymer of the ester of an olefinically unsaturated carboxylic acid does not produce polymeric products which resemble in physical properties the polymeric products of the instant process.

The preferred polymeric compositions embodied herein are those resulting from the polymerization of 100 parts by weight of (A) at least 70% by weight of at least one nitrile monomer having the structure

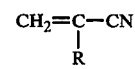

wherein R has the foregoing designation and (B) up to 30% by weight based on the combined weights of (A) and (B) of an ester having the structure

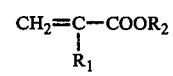

wherein $R_1$ and $R_2$ have the foregoing designations in the presence of from 1 to 40 parts by weight of (C) an elastomer selected from the group consisting of a copolymer of ethyl acrylate and acrylonitrile, a copolymer of ethyl acrylate and styrene, a copolymer of n-butyl acrylate and styrene, a copolymer of ethyl acrylate, styrene and glycidyl acrylate, and a copolymer of n-butyl acrylate, styrene and glycidyl acrylate.

More specifically, the present invention can be illustrated in the polymerization of a mixture of acrylonitrile and methyl acrylate in the presence of a preformed rubbery copolymer of ethyl acrylate and acrylonitrile to produce a product having excellent impact strength, exceptionally good impermeability to gases and vapors when exposed to said gases and vapors in the form of a thin film or sheet, and excellent resistance to discoloration by heat.

In the foregoing polymerization, it is preferred that from about 1 to 40 and more preferably 1 to 20 parts of the preformed elastomer copolymer of the ester of the olefinically unsaturated carboxylic acid be employed for each 100 parts of combined acrylonitrile and methyl acrylate. It has generally been found that as the relative amount of the elastomer is increased in the final polymeric product, the impact strength increases and gas and vapor barrier properties decrease somewhat. It is generally preferred to use just enough of the rubbery copolymer to impart the desired impact strength to the polymeric product and to retain the optimum gas and vapor barrier properties in the final polymeric product.

The novel polymeric products of the present invention are thermoplastic materials which can be thermoformed into a wide variety of useful articles in any of the conventional ways employed with known thermoplastic materials, such as by extrusion, milling, molding, drawing, blowing, etc. The polymeric products of this invention have excellent solvent resistance, and their impact strength, low permeability to gases and vapors, and color stability make them very useful in the packaging industry, and they are particularly useful in the manufacture of bottles, film, and other types of containers for liquids and solids.

In the following illustrative examples, the amounts of ingredients are expressed in parts by weight unless otherwise indicated.

EXAMPLE 1

A. An ethyl acrylate-acrylonitrile copolymer elastomer was prepared in latex form using the following ingredients:

| Ingredient | Parts |
| --- | --- |
| ethyl acrylate | 95 |
| acrylonitrile | 5 |
| ammonium persulfate | 0.5 |
| sodium bisulfite | 0.5 |
| ferrous sulfate . 7 H$_2$O | 0.03 |
| sodium lauryl sulfate | 3.5 |
| water | 200 |

The polymerization was carried out in the substantial absence of oxygen for about 4½ hours until a final conversion of about 98% was obtained.

B. A copolymer of acrylonitrile and methyl acrylate was prepared in the presence of the elastomer latex from A above using the following ingredients:

| Ingredient | Parts |
| --- | --- |
| acrylonitrile | 75 |
| methyl acrylate | 25 |
| potassium persulfate | 0.06 |
| limonene dimercaptan | 1.0 |
| Gafac RE 610-K* | 3.0 |
| water (total) | 280 |
| elastomer A (solids basis) | 20 |

*A mixture of R-O-(CH$_2$CH$_2$O-)$_n$PO$_3$M$_2$ and [R-O-(CH$_2$CH$_2$O-)$_n$]$_2$PO$_2$M wherein n is a number of from 1 to 40, R is an alkyl or alkaryl group and preferably a nonyl phenyl group, and M is hydrogen, ammonia or an alkali metal, which composition is sold by GAF Corporation.

The polymerization was carried out at 60° C. for 16 hours to a final conversion of about 90%. The resin was obtained in 98% conversion. The resin was isolated by coagulation, washing and drying and was found to have a notched Izod impact strength of 0.8 foot pound per inch of notch and other excellent physical properties.

EXAMPLE 2

The procedures of Example 1A and 1B were repeated except that 95 parts of ethyl acrylate and 5 parts of styrene were used in A in place of the 95 parts of ethyl acrylate and 5 parts of acrylonitrile. The final resin was found to have a notched Izod impact strength of 0.8 foot pound per inch of notch and other excellent physical properties.

EXAMPLE 3

The procedures of Example 1A and 1B were repeated except that 71 parts of n-butyl acrylate and 29 parts of styrene were used in A in place of the 95 parts of ethyl acrylate and 5 parts of acrylonitrile. The final resin was found to have a notched Izod impact strength of 1.1 foot pounds per inch of notch and other excellent physical properties.

EXAMPLE 4

The procedures of Example 1A and 1B were repeated except that 85 parts of ethyl acrylate, 5 parts of styrene, and 10 parts of glycidyl acrylate were used in place of the 95 parts of ethyl acrylate and 5 parts of acrylonitrile in A. The final resin was found to have a notched Izod impact strength of 0.73 foot pound per inch of notch and other excellent physical properties:
oxygen transmission rate: 4.24
water vapor transmission rate: 8.85
Brabender plasticorder torque: 410 meter grams

EXAMPLE 5

The procedures of Example 1A and 1B were repeated except that 66 parts of n-butyl acrylate, 24 parts of styrene, and 10 parts of glycidyl acrylate were used in A in place of the 95 parts of ethyl acrylate and 5 parts of acrylonitrile. The final resin was found to have a notched Izod impact strength of 0.8 foot pound per inch of notch.

We claim:
1. The polymer resulting from the polymerization of 100 parts by weight of
(A) at least 70% by weight of at least one nitrile monomer having the structure

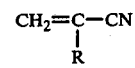

wherein R is hydrogen, a lower alkyl group having from 1 to 4 carbon atoms, or a halogen, and
(B) up to 30% by weight based on the combined weights of (A) and (B) of an ester having the structure

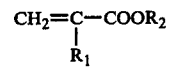

wherein R$_1$ is hydrogen, an alkyl group having from 1 to 4 carbon atoms, or a halogen, and R$_2$ is an alkyl group having from 1 to 6 carbon atoms or an epoxy or oxirane group having from 2 to 6 carbon atoms in the presence of from 1 to 40 parts by weight of
(C) an elastomer selected from the group consisting of a copolymer of ethyl acrylate, styrene and glycidyl acrylate, and a copolymer of n-butyl acrylate, styrene and glycidyl acrylate.

2. The polymer of claim 1 wherein the nitrile monomer is at least one member selected from the group consisting of acrylonitrile and methacrylonitrile.

3. The polymer of claim 2 wherein the nitrile monomer is acrylonitrile.

4. The polymer of claim 3 wherein the ester (B) is a member selected from the group consisting of methyl acrylate and ethyl acrylate.

5. The process comprising polymerizing in an aqueous medium in the substantial absence of oxygen at a temperature in the range of from about 0° to 100° C., 100 parts by weight of
(A) at least 70% by weight of at least one nitrile monomer having the structure

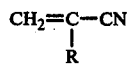

wherein R is hydrogen, a lower alkyl group having from 1 to 4 carbon atoms, or a halogen, and
(B) up to 30% by weight based on the combined weights of (A) and (B) of an ester having the structure

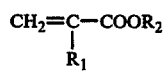

wherein $R_1$ is hydrogen, an alkyl group having from 1 to 4 carbon atoms, or a halogen, and $R_2$ is an alkyl group having from 1 to 6 carbon atoms or an epoxy or oxirane group having from 2 to 6 carbon atoms in the presence of from 1 to 40 parts by weight of
(C) an elastomer selected from the group consisting of a copolymer of ethyl acrylate, styrene and glycidyl acrylate, and a copolymer of n-butyl acrylate, styrene and glycidyl acrylate.

6. The process of claim 5 carried out in an aqueous emulsion.

7. The process of claim 6 wherein the nitrile monomer is at least one member selected from the group consisting of acrylonitrile and methacrylonitrile.

8. The process of claim 7 wherein the nitrile monomer is acrylonitrile.

9. The process of claim 7 wherein the ester (B) is at least one selected from the group consisting of methyl acrylate and ethyl acrylate.

* * * * *